US009235458B2

(12) United States Patent
Beatty, III et al.

(10) Patent No.: US 9,235,458 B2
(45) Date of Patent: Jan. 12, 2016

(54) METHODS AND SYSTEMS FOR DELEGATING WORK OBJECTS ACROSS A MIXED COMPUTER ENVIRONMENT

(75) Inventors: Harry J. Beatty, III, Clinton Corners, NY (US); Peter C. Elmendorf, Poughkeepsie, NY (US); Charles Gates, Poughkeepsie, NY (US); Chen Luo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 12/985,887

(22) Filed: Jan. 6, 2011

(65) Prior Publication Data
US 2012/0180054 A1 Jul. 12, 2012

(51) Int. Cl.
G06F 9/46 (2006.01)
G06F 9/54 (2006.01)

(52) U.S. Cl.
CPC .................................... *G06F 9/547* (2013.01)

(58) Field of Classification Search
None
See application file for complete search history.

(56) References Cited

U.S. PATENT DOCUMENTS

| | | | |
|---|---|---|---|
| 4,414,624 A | 11/1983 | Summer, Jr. et al. | |
| 5,193,191 A | 3/1993 | McKeeman et al. | |
| 5,307,492 A | 4/1994 | Benson | |
| 5,437,030 A | 7/1995 | Reitman et al. | |
| 5,553,286 A | 9/1996 | Lee | |
| 5,555,411 A | 9/1996 | England et al. | |
| 5,708,810 A | 1/1998 | Kern et al. | |
| 5,734,822 A | 3/1998 | Houha et al. | |
| 5,828,853 A | 10/1998 | Regal | |
| 5,860,006 A | 1/1999 | Osborne et al. | |
| 5,923,878 A | 7/1999 | Marsland | |
| 5,923,884 A | 7/1999 | Peyret et al. | |
| 5,933,639 A | 8/1999 | Meier et al. | |
| 6,026,362 A | 2/2000 | Kim et al. | |
| 6,112,023 A | 8/2000 | Dave et al. | |
| 6,158,045 A | 12/2000 | You | |
| 6,158,047 A | 12/2000 | Le et al. | |
| 6,185,733 B1 | 2/2001 | Breslau et al. | |
| 6,209,020 B1 | 3/2001 | Angle et al. | |
| 6,324,683 B1 | 11/2001 | Fuh et al. | |
| 6,374,402 B1 | 4/2002 | Schmeidler et al. | |
| 6,397,331 B1 | 5/2002 | Ober et al. | |
| 6,442,752 B1 | 8/2002 | Jennings et al. | |
| 6,487,577 B1 | 11/2002 | Sundararajan | |
| 6,493,728 B1 | 12/2002 | Berger | |
| 6,560,609 B1 | 5/2003 | Frey et al. | |
| 6,708,195 B1 * | 3/2004 | Borman et al. | ................ 718/102 |
| 6,711,616 B1 | 3/2004 | Stamm et al. | |
| 6,748,459 B1 | 6/2004 | Lin et al. | |

(Continued)

OTHER PUBLICATIONS

Anthony Chronopoulous, "A Class of Parallel Iterative Methods Implemented on Multiprocessors", Dept of Computer Science, University of IL, Nov. 1986.

(Continued)

*Primary Examiner* — Gregory A Kessler
(74) *Attorney, Agent, or Firm* — Cantor Colburn LLP; Steven Meyers

(57) ABSTRACT

A method of delegating work of a computer program across a mixed computing environment is provided. The method includes: performing on one or more processors: allocating a container structure on a first context; delegating a new operation to a second context based on the container; receiving the results of the new operation; and storing the results in the container.

16 Claims, 7 Drawing Sheets

(56) References Cited

U.S. PATENT DOCUMENTS

| | | |
|---|---|---|
| 5,915,511 A1 | 2/2005 | Susaria et al. |
| 6,886,081 B2 | 4/2005 | Harres |
| 6,901,588 B1 | 5/2005 | Krapf et al. |
| 6,915,511 B2 | 7/2005 | Susarla et al. |
| 6,931,636 B2 | 8/2005 | Deao et al. |
| 6,975,595 B2 * | 12/2005 | Peterson ............ 370/252 |
| 7,031,887 B2 | 4/2006 | Jain et al. |
| 7,073,170 B2 | 7/2006 | Grier et al. |
| 7,174,544 B2 | 2/2007 | Zee |
| 7,281,247 B2 | 10/2007 | Lodwick et al. |
| 7,321,958 B2 | 1/2008 | Hofstee et al. |
| 7,401,219 B2 | 7/2008 | Aho et al. |
| 7,415,703 B2 | 8/2008 | Aguilar, Jr. et al. |
| 7,519,800 B2 | 4/2009 | Michaelis |
| 7,533,389 B2 | 5/2009 | Verbeke et al. |
| 7,555,744 B2 | 6/2009 | Chkodrov et al. |
| 7,574,438 B2 * | 8/2009 | Cina .................. 1/1 |
| 7,584,239 B1 | 9/2009 | Yan et al. |
| 7,657,573 B1 | 2/2010 | Hancsarik |
| 7,689,783 B2 | 3/2010 | Hofstee et al. |
| 7,689,784 B2 | 3/2010 | Suzuoki |
| 7,992,133 B1 | 8/2011 | Theroux et al. |
| 8,001,427 B2 | 8/2011 | Sohm et al. |
| 8,205,095 B2 | 6/2012 | Chung |
| 2001/0047512 A1 | 11/2001 | Szewerenko et al. |
| 2002/0144248 A1 | 10/2002 | Forbes et al. |
| 2002/0170047 A1 | 11/2002 | Swetland |
| 2003/0009467 A1 | 1/2003 | Perrizo |
| 2003/0012440 A1 | 1/2003 | Nakanishi |
| 2003/0088865 A1 | 5/2003 | Lim et al. |
| 2003/0135621 A1 | 7/2003 | Romagnoli |
| 2004/0019890 A1 | 1/2004 | Verbeke et al. |
| 2004/0054861 A1 | 3/2004 | Harres |
| 2004/0172383 A1 | 9/2004 | Yoshida |
| 2004/0215522 A1 * | 10/2004 | Eder .................. 705/26 |
| 2004/0243979 A1 | 12/2004 | Pugh et al. |
| 2004/0268345 A1 | 12/2004 | Lodwick et al. |
| 2005/0081181 A1 | 4/2005 | Brokenshire et al. |
| 2005/0086644 A1 | 4/2005 | Chkodrov et al. |
| 2005/0165847 A1 | 7/2005 | Kusama |
| 2005/0223359 A1 | 10/2005 | Nagaraju et al. |
| 2005/0262109 A1 | 11/2005 | Alexandrescu |
| 2006/0037011 A1 | 2/2006 | Shi et al. |
| 2006/0069713 A1 | 3/2006 | Wei et al. |
| 2006/0095898 A1 | 5/2006 | Chow et al. |
| 2006/0130065 A1 | 6/2006 | Chin et al. |
| 2006/0168571 A1 | 7/2006 | Ghiasi et al. |
| 2006/0225060 A1 | 10/2006 | Goyan |
| 2007/0006174 A1 | 1/2007 | Sohm et al. |
| 2007/0011494 A1 | 1/2007 | Xie et al. |
| 2007/0033592 A1 | 2/2007 | Roediger et al. |
| 2007/0055958 A1 | 3/2007 | Birenheide et al. |
| 2007/0220517 A1 * | 9/2007 | Lippett .............. 718/102 |
| 2007/0250814 A1 | 10/2007 | Bendapudi et al. |
| 2007/0283358 A1 | 12/2007 | Kasahara et al. |
| 2008/0209405 A1 | 8/2008 | Roberts et al. |
| 2008/0244599 A1 | 10/2008 | Hodson et al. |
| 2008/0313640 A1 | 12/2008 | Liu et al. |
| 2009/0070750 A9 | 3/2009 | Gu |
| 2009/0119513 A1 | 5/2009 | Chung |
| 2009/0164995 A1 | 6/2009 | Waris |
| 2009/0228892 A1 | 9/2009 | Di Luoffo et al. |
| 2010/0100941 A1 | 4/2010 | Eom et al. |
| 2010/0146013 A1 | 6/2010 | Mather |
| 2010/0162226 A1 | 6/2010 | Borissov |
| 2010/0299499 A1 | 11/2010 | Golla et al. |
| 2010/0302944 A1 | 12/2010 | Bessis et al. |
| 2010/0318693 A1 | 12/2010 | Espig et al. |
| 2011/0289100 A1 | 11/2011 | Madhavarapu |
| 2011/0320501 A1 | 12/2011 | Woodard |
| 2012/0180054 A1 | 7/2012 | Beatty, III et al. |
| 2012/0185677 A1 | 7/2012 | Beatty, III et al. |
| 2012/0185828 A1 | 7/2012 | Beatty, III et al. |
| 2012/0185837 A1 | 7/2012 | Beatty, III et al. |
| 2013/0086338 A1 | 4/2013 | Blainey et al. |
| 2013/0086570 A1 | 4/2013 | Blainey et al. |

OTHER PUBLICATIONS

Khalifa et al., "Dynamic On-Line Allocation of Independent Task onto Heterogeneous Computing Systems to Maximize Load Balancing", 978-1-4244-3555-5/08 IEEE 2008.

Mark Edward Segal et al., "Dynamic Program Updating in a Distributed Computer System", IP.com, IPCOM00128761D, 1989.

PCT Application No. PCT/US012/020256 Filed: Jan. 5, 2012 Applicant: International Business Machines Corporation International Search Report and Written Opinion.

"Sourcery G++ Lite ARM EABI Sourcery G++ Lite 2010q1-188 Getting Started", CodeSourcery, 2009, pp. 1-91.

Herman Chung-Hwa Rao, "Distributed Application Framework for Large Scale Distributed System", IEEE, 1993, pp. 31-38.

Larry Peterson et al., "Distributed Shared Library", ACM, 1992, pp. 1-5.

"distcc: a fast, free distributed CIC++ compiler", Distcc, Dec. 2004, <https://code.google.com/p/distcci>, pp. 1-2.

Harold Carr et al., "Compiling Distributed C++", IEEE, 1993, <http://ieeexplore.ieee.org/stamp/stamp.jsp?tp=&arnumber=395492>, pp. 1-8.

Meier, M., et al., Experiences with Building Distributed Debuggers, SPDT '96 Proceedings of the SIGMETRICS symposium on Parallel and distributed tools, 1996, pp. 70-79.

Miller, B., et al., A Mechanism for Efficient Debugging of Parallel Programs, PADD '88 Proceedings of the 1988 ACM SIGPLAN and SIGOPS workshop on Parallel and distributed debugging, 1988, pp. 141-150.

Peter Fritzson, "Preliminary Experience from the DICE system a Distributed Incremantal Compiling Environment", ACM, 1984, <http://delivery.acm.org/10.1145/810000/808256/p113-fritzson.pdf>, pp. 1-11.

* cited by examiner

METHODS AND SYSTEMS FOR DELEGATING WORK OBJECTS ACROSS A MIXED COMPUTER ENVIRONMENT

BACKGROUND

The present invention relates to systems, method and computer program products for delegating work in a computer environment.

Parallel programming is a form of parallelization of computer code across multiple processors in parallel computing environments. Task parallelism distributes execution processes (threads) across different parallel computing nodes.

In order to write a parallel program, programmers should understand how to use mutex locks, how to avoid dead lock situations, when to instruct the compiler not to optimize because it might jeopardize the parallel integrity of the system, and should make sure there is no concurrency around critical data. Simplifying parallelizing a program requires removing many of these difficult error prone steps.

SUMMARY

According to one embodiment, a method of delegating work of a computer program across a mixed computing environment is provided. The method includes: performing on one or more processors: allocating a container structure on a first context; delegating a new operation to a second context based on the container; receiving the results of the new operation; and storing the results in the container.

According to another embodiment, a computer program product for delegating work of a computer program across a mixed computing environment is provided. The computer program product includes a tangible storage medium readable by a processing circuit and storing instructions for execution by the processing circuit for performing. The method includes: allocating a container structure on a first context; delegating a new operation to a second context based on the container; receiving the results of the new operation; and storing the results in the container.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
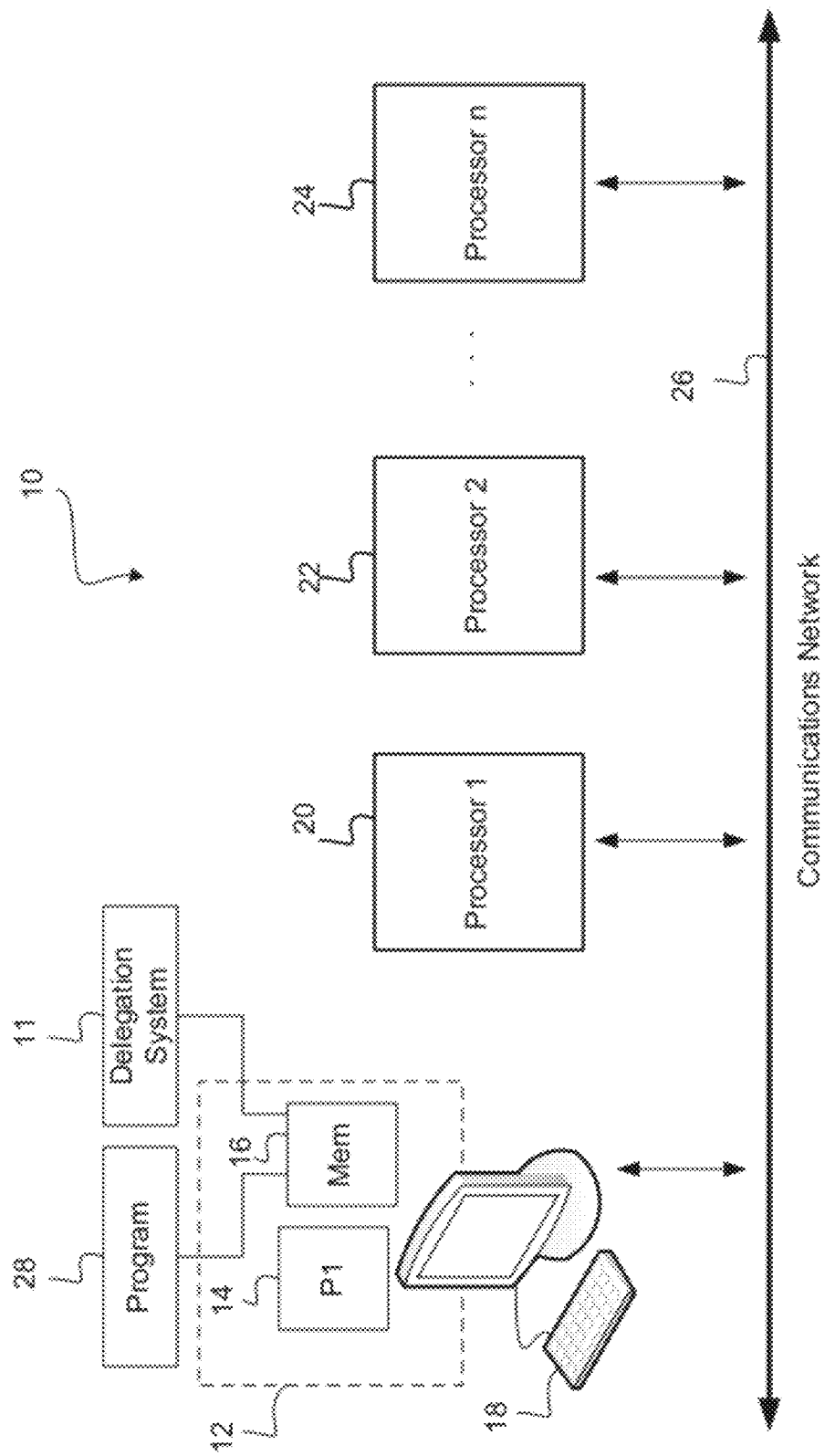
FIG. 1 is a block diagram illustrating a computing system that includes a delegation system in accordance with exemplary embodiments.

The following description is merely exemplary in nature and is not intended to limit the present disclosure, application, or uses. It should be understood that throughout the drawings, corresponding reference numerals indicate like or corresponding parts and features.

With reference now to FIG. 1, a computer system is shown generally at 10 that includes a delegation system 11 in accordance with various embodiments. The computer system 10 includes a first machine 12 that includes a first processor 14 that communicates with computer components such as memory devices 16 and peripheral devices 18. The computer system 10 further includes one or more other processors 20-24 that can similarly communicate with computer components 16, 18 and with the other processors 14, 20-24. In various embodiments, the one or more other processors 20-24 can be physically located in the same machine 12 as the first processor 14 or can be located in one or more other machines (not shown).

Each of the processors 14, 20-24 communicates over a network 26. The network 26 can be a single network or multiple networks and can be internal, external, or a combination of internal and external to the machine 12, depending on the location of the processors 14, 20-24.

In various embodiments, each processor 14, 20-24 can include of one or more central processors (not shown). Each of these central processors can include one or more subprocessors. The configuration of these central processors can vary. Some may be a collection of stand alone processors attached to memory and other devices. Other configurations may include one or more processors that control the activities of many other processors. Some processors may communicate through dedicated networks or memory where the controlling processor(s) gather the necessary information from disk and other more global networks to feed the smaller internal processors.

In the examples provided hereinafter, the computing machines 12 and processors 14, 20-24 will commonly be referred to as nodes. The nodes perform portions of a computer program 28 using the delegation system 11.

Figure 2:
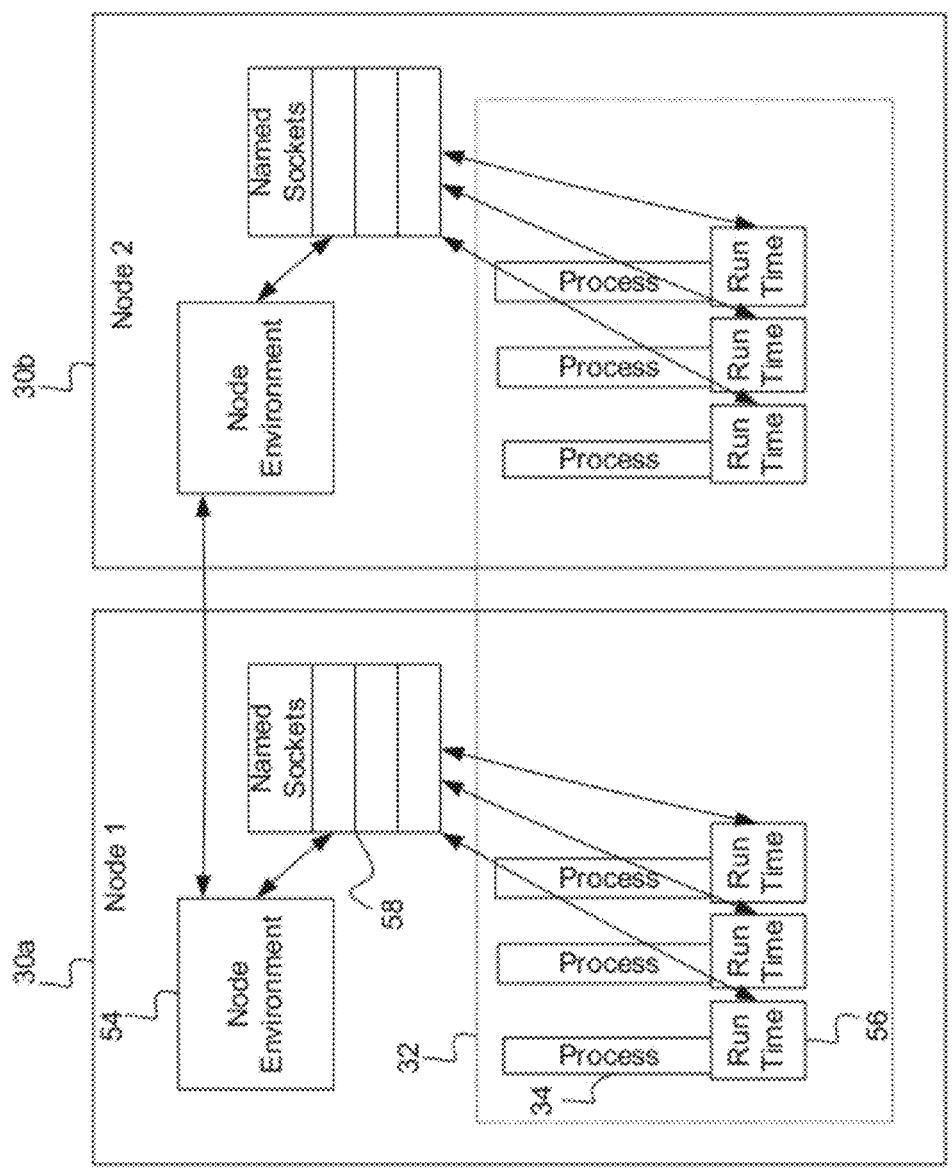
FIGS. 2 and 3 are block diagrams illustrating the computing system of FIG. 1 in more detail in accordance with exemplary embodiments.
Figure 3:
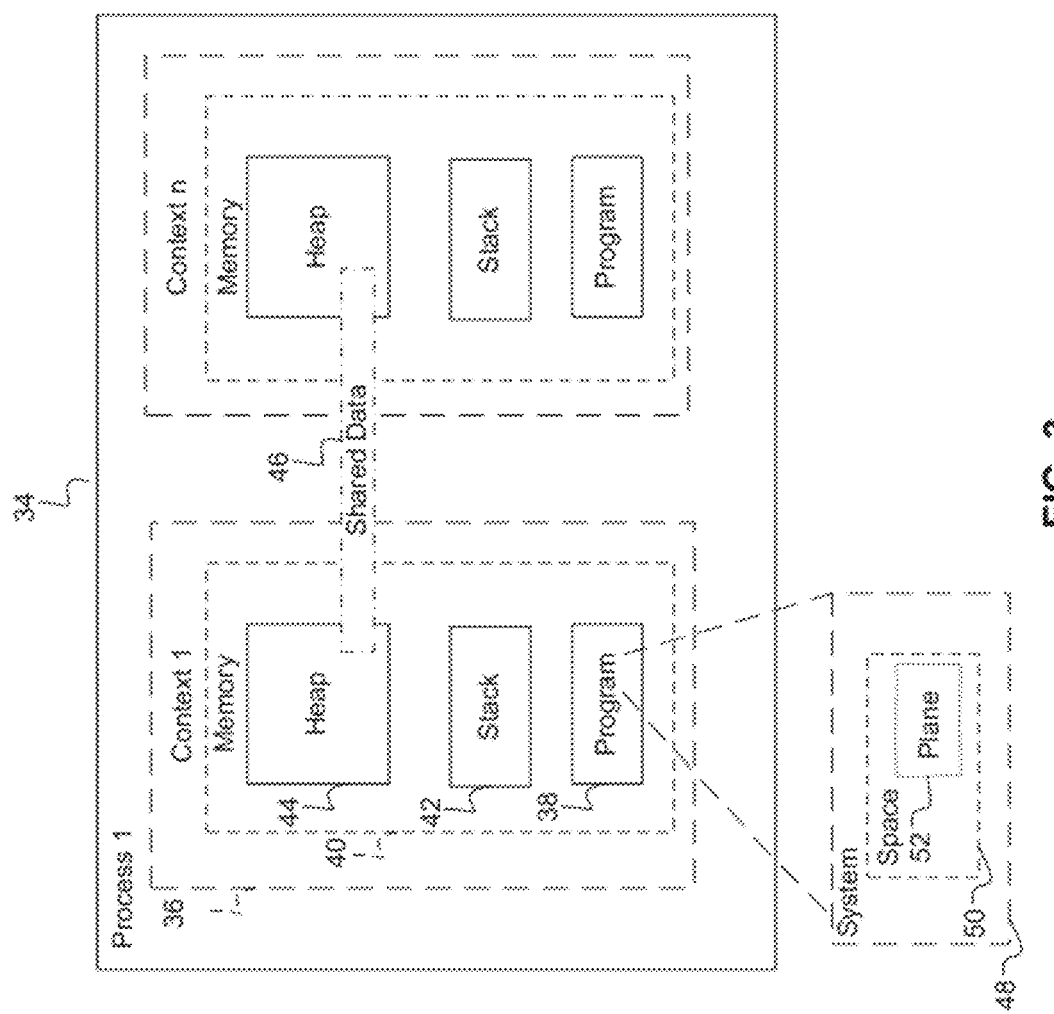

With reference now to FIGS. 2 and 3, the examples herein will be discussed in the context of two nodes 30a and 30b. As can be appreciated, the delegation system 11 of the present disclosure is applicable to any number nodes and is not limited to the present examples. As discussed above, the nodes 30a and 30b are implemented according to different architectures. The nodes perform portions of the computer program 28. A single instantiation of a computer program 28 is referred to as a universe 32. The universe 32 is made up of processes 34.

As shown in FIG. 3, each process 34 operates as a hierarchy of nested contexts 36. Each context 36 is program logic 38 of the computer program 28 (FIG. 1) that operates on a separate memory image. Each context 36 can be associated with private memory 40, a stack 42, and a heap 44. The context 36 may have shared data 46 for global variables and program logic 58.

The program logic 38 of each context 36 can be composed of systems 48, spaces 50, and planes 52. For example, the universe 32 (FIG. 2) is the root of the hierarchy and within the universe 32 (FIG. 2) there can be one or more systems 48. The system 48 can be a process 34 that includes one or more spaces 50 and/or planes 52. A space 50 is a separate and distinct stream of executable instructions. A space 50 can include one or more planes 52. Each plane 52 within a space 50 uses the same executable instruction stream, each in a separate thread.

With reference back to FIG. 2, to enable the execution of the universe 32 across the nodes 30*a*, 30*b*, each node 30*a*, 30*b* includes a node environment 54. The node environment 54, handles the linking and operational communications being passed between the nodes 30*a*, 30*b*. In various embodiments, the node environment 54 communicates with other node environments using for example, network sockets (not shown).

To further enable the execution of the universe 32 across the nodes 30*a*, 30*b*, and within the nodes 30*a*, 30*b*, each process 34 may include or be associated with a collection of support routines called a run-time environment 56 (as will be discussed in more detail below). In various embodiments, the node environment 54 communicates with the run-time environment 56 using name sockets 58. As can be appreciated, other forms of communication means may be used to communicate between systems such as, for example, shared memory.

With reference now to FIGS. 4-7, portions of the run-time environment 56 will be described in accordance with various embodiments. In particular, the ownership and delegation process provided by the run-time environment 56 will be described in accordance with exemplary embodiments.

With regard to the ownership, in order to execute a computer program 28 (FIG. 1) across a mixed computing environment, ownership properties and functions are established. In various embodiments, each object of a computer program 28 (FIG. 1) is owned by a particular context 36. An owning context 36*b* is responsible for performing any operations on the object. The owning context 36*b* is determined when the object is created and holds that relationship until the object is destroyed. This removes any need for using semaphores or serialization associated with that object. For example, since the owning context 36*b* is the only context that can operate on the data, the owning context 36*b* can modify the data without having to explicitly serialize its access to the data.

Other contexts that need operations performed on that object may delegate that operation to the owning context 36*b*. The context that requests the construction and that delegates operations on the object is called a delegating context 36*a*. The delegation can be a local delegation between contexts 36*a*. 36*b* within a node 30*a* (see FIG. 4) or can be a distant delegation between contexts 36*a*, 36*c* on different nodes (see FIG. 5).

Figure 4:
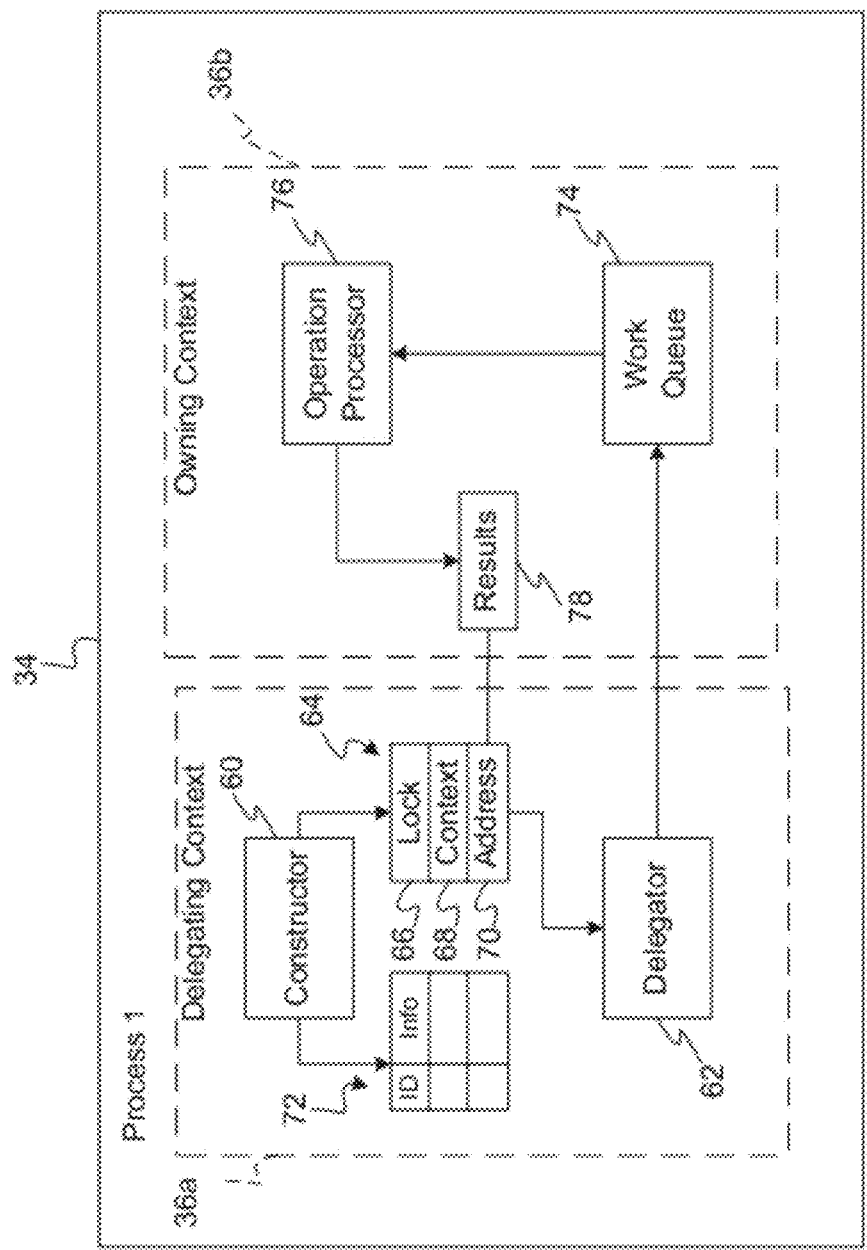
FIGS. 4 and 5 are block diagrams illustrating the delegation system in accordance with exemplary embodiments.
Figure 5:
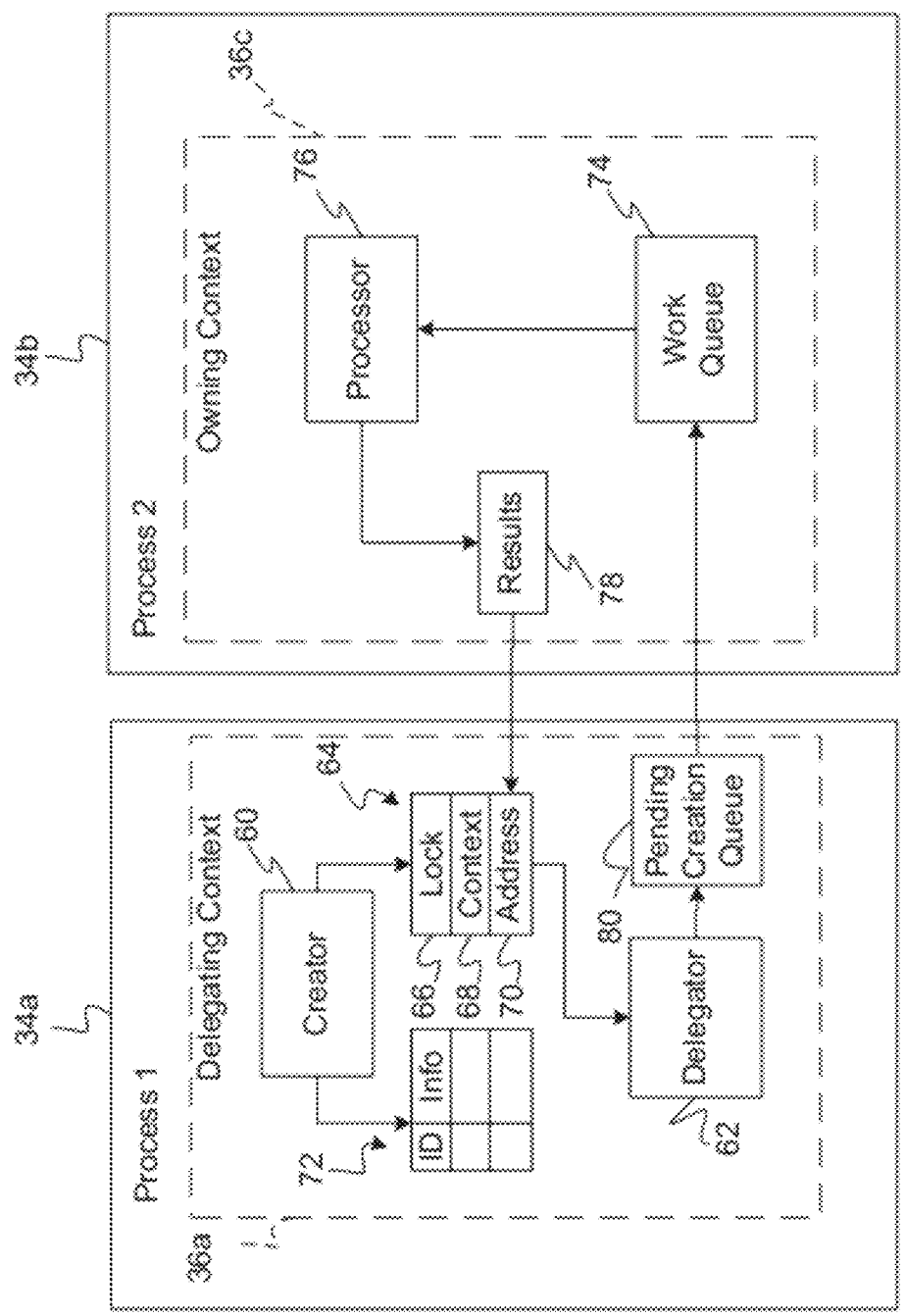

In various embodiments, as shown in FIGS. 4 and 5, the run-time environment 56 includes a constructor 60 and a delegator 62. The constructor 60 identifies the owner of the object. The owner can be identified by, for example, determining if the owner is operating in the same address space. The constructor 60 may determine this through a look up table 72 that identifies how the contexts were created. If the owning context 36*b* was created via a new thread, the constructor 60 knows the address space is the same. If the owning context 36*b* was not created as a result of a new thread, the owning context 36*b* is in a different address space. The lookup table can further include information on how to interact with the other contexts.

Based on the ownership, the constructor 60 creates a container structure 64 for the object. The container 64 can include, but is not limited to, a lock 66, a context identification 68, and an address 70. For example, when a delegating context 36*a* creates a new object for an owning context 36*b* (other than itself), the delegating context 36*a* creates the container 64. The lock 66 of the container 64 is a mutex that is locked on behalf of the owning context 36*b*. The mutex lock includes a control variable containing the context identity 68 of the lock holder. When a context other than the lock holder attempts to acquire the lock that context will be blocked. When the lock holder attempts to acquire the lock, the access is permitted. This allows one context to lock on behalf of another.

The address 70 of the container 64 is memory for the owning context 36*b* to use to store results 78 of the object. That memory can be the size of the object or the size of a pointer. For example, if the container 64 includes enough memory for the data, the owning context 36*b* can use that memory for the object. In another example, if the container 64 only includes enough memory for a pointer, the owning context 36*b* can allocate a new object and place a pointer to that new object inside the container 64.

Once the constructor 60 establishes the container 64 and locks the container 64 on behalf of the owning context 36*b*, the delegator 62 then delegates a "new operation" to the owning context 36*b*. In order to delegate the operation, the delegator 62 generates a package that includes enough information to determine what operation to perform, what arguments the operation requires, and where to put the results. In various embodiments, the delegation function can be a structure that contains a function pointer for cases where the owner is in the same address space and an index into a function table in the case where the owner is not. Further in the case where the owning context 36*b* is in the same address space the function pointer is not the pointer to the constructor but rather a pointer to the function that knows how to unpack the structure and call the actual constructor. This additional service function can be automatically generated by a compiler.

In the case where a distant delegation is performed, as shown in FIG. 5, an addressing system may further be used that allows the delegating context 36*a* to uniquely identify to the owning context 36*b* the object for which the operation is intended. For example, a pointer system may be used. A pointer can be broken into two components. The first being the context that owns the data and the second is the index to that data. There are at least two ways to represent such a system. One is a structure that contains two elements: the context and the pointer. Another way is a composite where the context is held in the higher order bytes of a long word and the offset is in the low order of the long word. In either case, the type has to be uniquely identified and known to the system as a universal pointer. Once dereferenced, the context can automatically separate the two components, the context and the offset. The context can send the target context a message containing the offset to the data as well as the designated operation such as retrieving the data.

The owning context 36*b*, through a delegation process, removes the new operation from a work queue 74 and performs the operation on an operation processor 76. Through the operation, the owning context 36*a* allocates the contents of the structure, places the new information within the address 70 of the container 64, and unlocks the container 64.

Any time after the "new operation" has been delegated, the delegating context 36*a* can use the container 64 to delegate other operations on the container 64. The container 64 is used by the owning context as a class identifier in the same way as "this" is used in an object oriented language. Access to the data is controlled by the mutex lock not the pointer itself. Therefore, once the container 64 is allocated the owning context 36*b* has the necessary reference to perform the requested operations.

To insure correct operation of the delegated operations, in-order delegations are used until the construction of the object is complete. An in-order delegation forces the owning context 36*b* to perform the operations in the same order as they were placed on the work queue 74. After the creation of the object is complete, both in-order and out-of-order delegations are processed. For example, until the object is completely constructed the delegating context 36a holds the delegation beginning with the first out-of-order delegation. After construction is complete the held delegations are released in the order they were received and given to the owner for processing. This restriction prevents any out-of-order operations from attempting to work on an object before the object is constructed. Each successive operation request on the object uses the same container pointer so each successive operation sees the results of the previous delegations on that object.

In computing systems where the delegation is built into the language with proper safeguards, the mutex lock operation can be removed. This can be accomplished, for example, by the "this" object being an opaque type, where the programmer can't reference but the owning context can cast into a meaningful data type. Because the delegating contexts can't reference the object, only the owner will be able to access the data. This removes all locks except those used to place the operation on the work queue 74 of the owning context 36a. Further this allows the delegating context 36a to delegate operations on the object before the owning context 36b may have completed construction.

With specific reference now to FIG. 5, when the delegating context 36a and an owning context 36c are not in the same process 34 rather different processes 34a, 34b, the procedure has some additional steps. A pending creation queue 80 is provided that holds all in-order delegations for a given context and all delegation operations for the pending creation operation until the owning context 36c has returned a valid object handle. Once the handle is returned the run-time system in control of the pending creation queue delegates any pending operations to the owners that have valid handles. The release process is in-order and repeats until the first null handle is encountered. A null handle indicates that another creation operation to that owner has not yet completed. Because these are in-order operations, no operation will be requested of an object that hasn't already been created. To enable the easy detection of returned objects the reference on the queue is the address of where the owner will place the object's handle.

When that handle in the reference is not null the queue is able to release this delegation to the owning context 36c. Ownership requires that the new operator have an additional argument called the owning context. It may be implemented as an additional argument or a delegation operation permitted on the new operator. In either case, the context that owns the data does the construction. Additionally the destructor functions need to be owner aware.

As can be appreciated, the processes 34a and 34b can each include transceivers (not shown) that transmit and receive the operations and results 78 between the processes 34a 34b and that place the operations and results 78 in their respective locations (e.g., the work queue 74, or the address 70).

With reference now to FIGS. 6A, 6B, 7A, and 7B and with continued reference to FIG. 4, flowcharts illustrate ownership and delegation methods of the delegation system in accordance with exemplary embodiments. As can be appreciated in light of the disclosure, the order of operation within the method is not limited to the sequential execution as illustrated in FIGS. 6A, 6B, 7A, and 7B, but may be performed in one or more varying orders as applicable and in accordance with the present disclosure. As can further be appreciated, one or more steps may be added or removed without altering the spirit of the method.

Figure 6B:
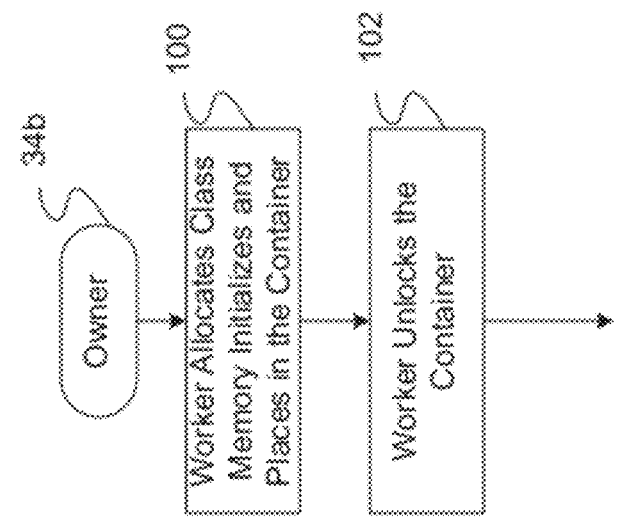
FIGS. 6A, 6B, 7A, and 7B are flowcharts illustrating delegation methods in accordance with exemplary embodiments.
Figure 6A:
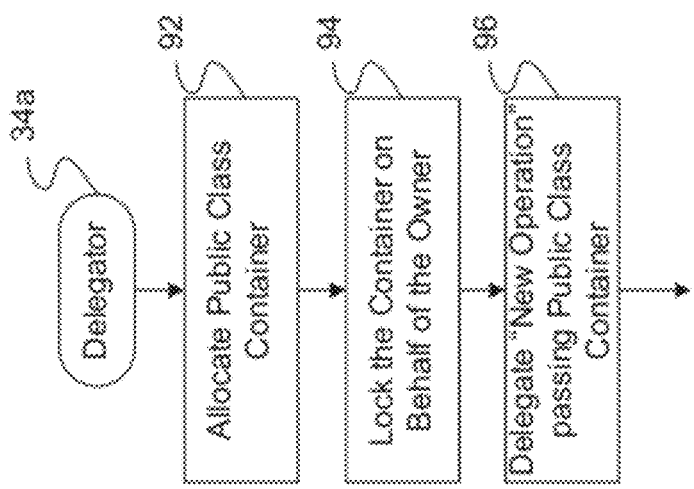

In FIGS. 6A and 6B, an ownership method is shown. The method may begin at 92 with the delegating context 34a allocating the container 64. The container is locked on the behalf of the owning context 34a at 94. The "new operation" is then delegated using the container 64 at 96. Thereafter, the delegating context 34a may continue with further processing.

The owning context 36b receives the new operation and allocates the memory, initializes the value, and places the object value in the container at 100. The container is unlocked at 102. Thereafter, the method owning context 34b may continue with further processing.

Figure 7B:
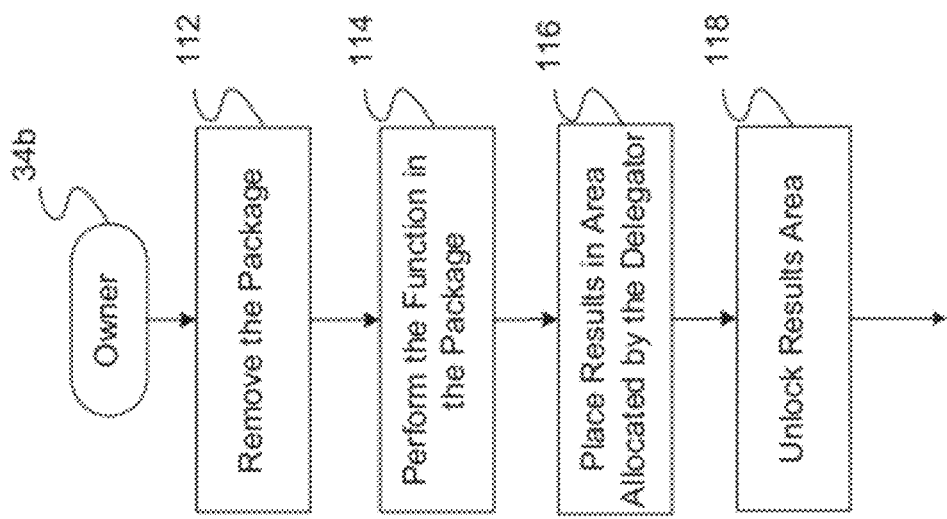
Figure 7A:
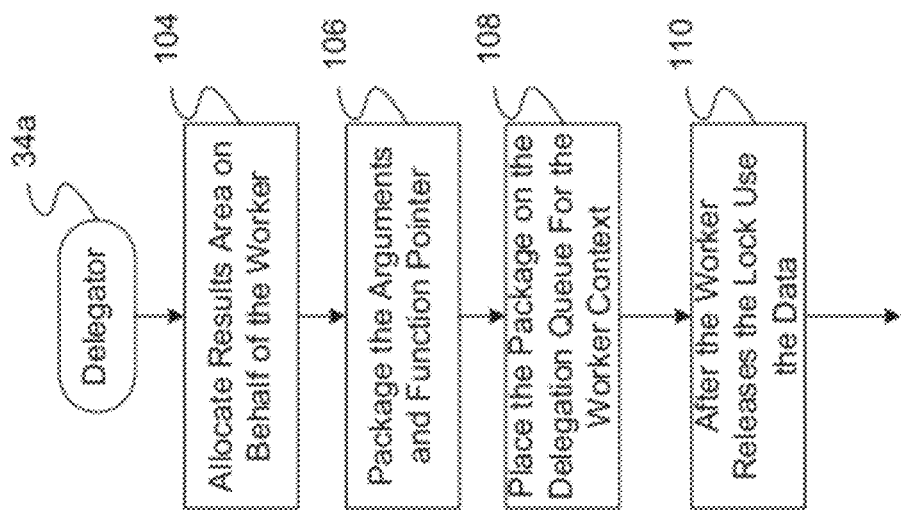

In FIGS. 7A and 7B, a delegation method is shown. The method may begin at 104 with the delegating context 34a allocating a results area on behalf of the owning context at 104. The package is generated that includes arguments and function pointers (as discussed above) at 106. The package is placed on the delegation queue 74 of the owning context 34b at 108. After the owning context 34b releases the lock, the data is used at 110. Thereafter, the delegating context 34a may continue with further processing.

The owning context removes the package from the queue 74 at 112. The package is interpreted and the function is performed at 114. The results of the function are placed in the area allocated by the delegator at 116. The results are unlocked at 118. Thereafter, the owning context 34b may continue with further processing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of delegating work of a computer program across a mixed computing environment, comprising:
performing on one or more processors:
allocating a container structure that includes a lock on a delegating context, the delegating context requesting constructing and delegating operations;
delegating a new operation to a owning context based on the container being established and locked on behalf of the owning context, the owning context being determined based on an object being created;
receiving the results of the new operation;
storing the results in the container; and
utilizing the container to delegate other operations on the object by the delegating context based on the new operation being delegated, the owning context being the only context for performing the other operations.

2. The method of claim 1 further comprising unlocking the container after the storing.

3. The method of claim 1 wherein the container includes a context identification that indentifies the owning context.

4. The method of claim 1 wherein the results include data.

5. The method of claim 1 wherein the results include a pointer to data.

6. The method of claim 1 wherein the delegating context is program logic of the computer program that operates on a separate memory image from the delegating context.

7. The method of claim 1 wherein the first context is of a delegating process and the owning context is of a different process.

8. The method of claim 1 further comprising managing a pending delegations queue based on the receiving the results.

9. A computer program product for delegating work of a computer program across a mixed computing environment, the computer program product comprising:
a tangible storage medium readable by a processing circuit and storing instructions for execution by the processing circuit for performing a method comprising:
allocating a container structure that includes a lock on a delegating context, the delegating context requesting constructing and delegating operations;
delegating a new operation to a owning context based on the container being established and locked on behalf of the owning context, the owning context being determined based on an object being created;
receiving the results of the new operation;
storing the results in the container, and
utilizing the container to delegate other operations on the object by the delegating context based on the new operation being delegated, the owning context being the only context for performing the other operations.

10. The computer program product of claim 9 further comprising unlocking the container after the storing.

11. The computer program product of claim 9 wherein the container includes a context identification that identifies the owning context as an owning context.

12. The computer program product of claim 9 wherein the results include data.

13. The computer program product of claim 9 wherein the results include a pointer to data.

14. The computer program product of claim 9 wherein the delegating context is program logic of the computer program that operates on a separate memory image from the delegating context.

15. The computer program product of claim 9 wherein the delegating context is of a first process and the owning context is of a different process.

16. The computer program product of claim 9 further comprising managing a pending delegations queue based on the receiving the results.

* * * * *